United States Patent [19]

Kobayashi et al.

[11] 4,304,992

[45] Dec. 8, 1981

[54] MAGNETIC CARD READER

[75] Inventors: Hiromasa Kobayashi; Tamio Miura, both of Tokyo, Japan

[73] Assignee: Kabushiki Kaisha Sankyo Seiki Seisakusho, Shimosuwa, Japan

[21] Appl. No.: 12,401

[22] Filed: Feb. 15, 1979

Related U.S. Application Data

[60] Division of Ser. No. 919,581, Jun. 27, 1978, abandoned, which is a continuation of Ser. No. 699,914, Jun. 25, 1976.

[30] Foreign Application Priority Data

Jun. 26, 1975 [JP] Japan ............... 50-79914

[51] Int. Cl.³ .............. G06K 7/08; G06K 7/016; G06K 13/06; H04N 7/18
[52] U.S. Cl. .................. 235/449; 235/474; 235/482; 235/493; 360/105; 360/2
[58] Field of Search ............ 360/104, 105, 2; 235/449, 450, 493, 381, 380, 474

[56] References Cited

U.S. PATENT DOCUMENTS

| 3,700,862 | 10/1972 | Snook et al. | 235/493 |
|-----------|---------|--------------|---------|
| 3,760,164 | 9/1973 | Kral | 235/493 |
| 3,836,753 | 9/1974 | Pass | 360/2 |
| 3,893,182 | 7/1975 | Schmidt | 235/483 |
| 3,914,789 | 10/1975 | Coker, Jr. et al. | 235/482 |
| 4,058,843 | 11/1977 | Gyi | 360/105 |

OTHER PUBLICATIONS

*Transducer Mounting*, Haughton & Hildebrand, IBM Tech. Disc. Bull., vol. 2, No. 3, Oct. 1959, 1 p.

*Primary Examiner*—Robert M. Kilgore
*Attorney, Agent, or Firm*—James C. Wray

[57] ABSTRACT

A sensor observes a timing track along a magnetic stripe on a magnetic card and detects change in the sliding speed of the magnetic card relative to the magnetic head as a timing signal, by which reading or writing of a data signal by the magnetic head is controlled. A corner of the timing track is removable to delay the timing signal and thereby control a read-only mode. The magnetic head is mounted centrally on a leafspring to follow bends in the card.

14 Claims, 15 Drawing Figures

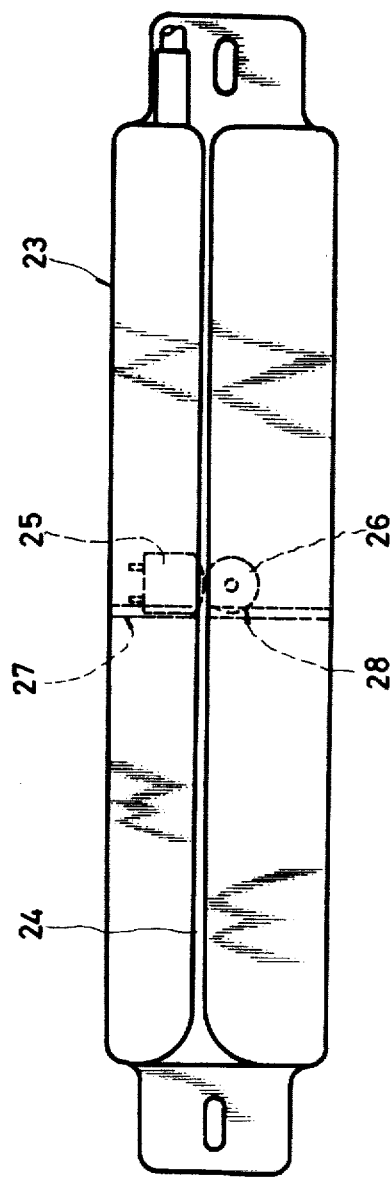
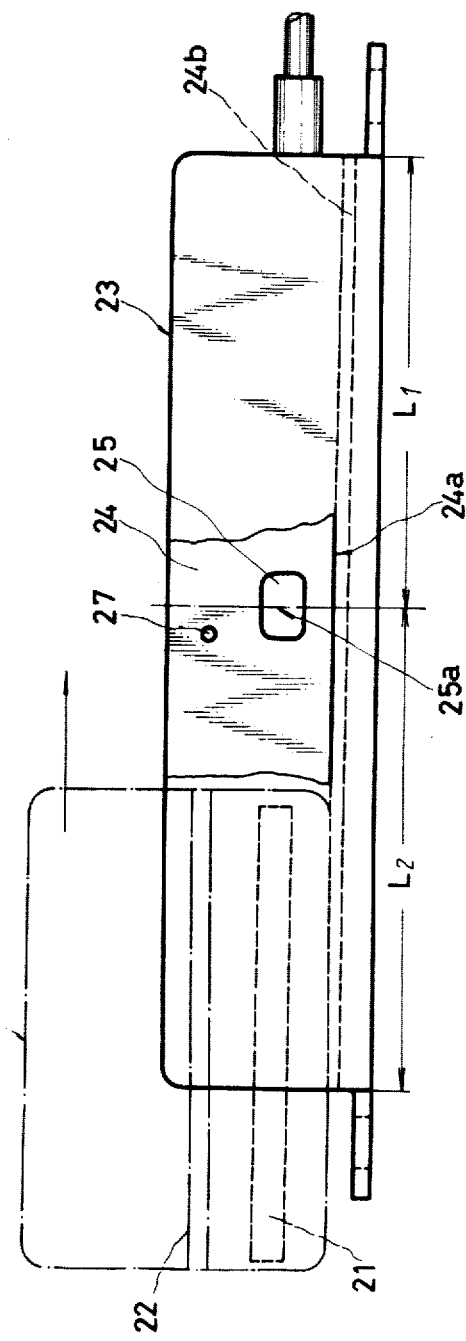
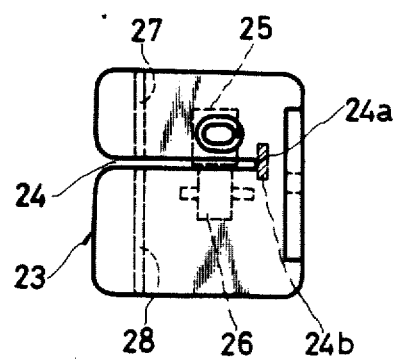

MAGNETIC CARD READER

This is a division of application Ser. No. 919,581, now abandoned, filed June 27, 1978, which is a continuation of application Ser. No. 699,914, filed June 25, 1976, and Japanese Application Sho No. 50-79914, filed June 26, 1975, the priorities of which are claimed.

BACKGROUND OF THE INVENTION

Prior art related to the present invention includes magnetic card readers, especially those with fluctuation in the sliding speed of the magnetic card relative to the magnetic head, for instance those in which the magnetic cards are manually moved. When magnetic stripes formed on magnetic cards are moved in sliding contact with magnetic heads to read or write information and the movement of the magnetic card is uneven, or too fast or too slow, errors occur and the reading or writing of information cannot properly take place with stability.

Since the magnetic card readers are much in use at banks and filling stations and are often used as media for direct cash transactions, accuracy and stability in the reading or writing of information by the magnetic card readers in whatever conditions of use are essential requirements. To properly exchange information between magnetic stripes on the magnetic cards and magnetic heads, it is desirable that, regardless of the moving speed of the magnetic card, information can be exchanged invariably at a specific density between the magnetic head and the magnetic stripe.

BRIEF SUMMARY OF THE INVENTION

Magnetic cards carry magnetic information stripes and timing tracks parallel to the magnetic stripes. Magnetic heads are moved in relative sliding contact with magnetic stripes while at the same time timing signals matching the moving speed of the magnetic cards are obtained from the timing tracks through detection means such as photo-sensors. The timing signals are employed to control the information input to or output from the magnetic heads. Magnetic head-holding mechanisms have magnetic heads elastically supported by leaf springs so that the magnetic heads can follow the bent contours of the magnetic cards.

The timing tracks formed on the magnetic cards are clippable to specific lengths from the card ends so that no erasures can be made and no new information can be written into the magnetic stripes of cards in which ends of the timing tracks have been clipped off.

The object of the present invention is to provide a magnetic head-holding mechanism which can follow the bend of the magnetic card not only in the longitudinal direction but also in the transverse direction.

One object of the present invention is to provide a magnetic card reader which can read or write information properly with stability even when the sliding speed of the magnetic card against the magnetic head changes widely.

Another object of the present invention is to provide a magnetic head-holding mechanism which can follow the bend of the magnetic card not only in the longitudinal direction but also in the transverse direction.

Still another object of the present invention is to provide a magnetic card which has a notch cut therein for the purpose of preventing a mistaken erasure of record.

The invention has as another object the provision of a magnetic card with an optical timing track.

A further object of the invention is the provision of a method for reading a magnetic card and for writing information on the card in precise timed relationship to relative movement of the card and a magnetic head.

These and other further objects and features of the invention are apparent in the disclosure which includes the specification with the above and following description and the claims and which also includes the drawings.

BRIEF DESCRIPTION OF THE DRAWINGS

FIG. 4 is a plan view of a magnetic card reader.

FIG. 5 is a side elevation of the magnetic card reader of FIG. 4, showing direction of motion of the magnetic card of FIGS. 1–3.

FIG. 6 is a right side elevation of the magnetic card reader shown in FIGS. 4 and 5.

DETAILED DESCRIPTION OF THE DRAWINGS

Figure 1:
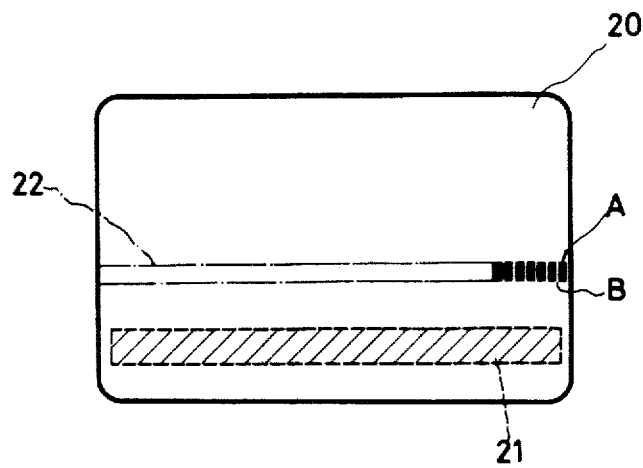
FIG. 1 is a front view of a magnetic card having a magnetic information stripe and a timing track.
Figure 2:
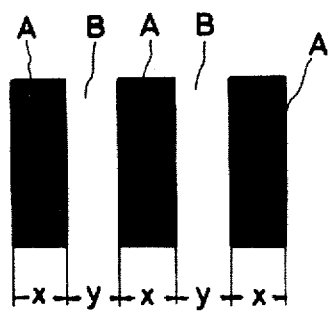
FIG. 2 is a partial detail front view of the timing track of the card shown in FIG. 1.

Referring to the attached drawings, the magnetic recording medium which is a magnetic card 20 illustrated in FIG. 1 consists of a transparent substance such as light-transmitting polyester or vinyl chloride, with magnetic stripe 21 formed on one side and timing track 22 printed parallel to magnetic stripe 21 on the other side of the card. As indicated in FIG. 2, timing track 22 contains non-transparent stripes A of a specific width x separated by gaps B of specific widths y from one stripe A to another.

As indicated in FIGS. 4–6, on magnetic recorder 23, a card-receiving slot 24 is formed in a longitudinal direction so that a card 20 may slide along the slot. Across the card-moving slot 24, magnetic head 25 and press roller 26 are located opposite to each other. A spring not shown urges press roller 26 toward the direction of a gap in magnetic head 25. Magnetic head 25 is set at such a level with regard to a bottom of slot 24, that the head bears against magnetic stripe 21 of magnetic card 20 sliding along bottom 24a of card-moving slot 24. Slot bottom 24a carries metal plate 24b buried therein.

Light receiving element 27 such as a photo-sensor receives light from light-emitting element 28. Elements 27 and 28 are set in opposition to each other across slot 24 and are spaced from bottom 24a to be flush with timing stripe 22 of magnetic card 20.

Elements 27 and 28 can be replaced with magnetic detection means or mechanical detection means.

Under the above arrangement, information can be written from the magnetic head 25 into the magnetic stripe 21 of card 20, or information can be read at specific intervals from magnetic stripe 21. In writing information, instantaneous moving speed, i.e. instantaneous velocity or acceleration, of magnetic card 20 is approximately estimated from the signals issued from elements 27 and 28 when the opaque stripes A and the transparent stripes B of the timing track 22 pass between elements 27 and 28. Thereby writing frequency is selected to write into magnetic stripe 21. In reading information, timing for reading is approximately taken through synchronization of signals issued from timing track 22 as it passes between elements 27 and 28 and thereby information is read.

Figure 7:
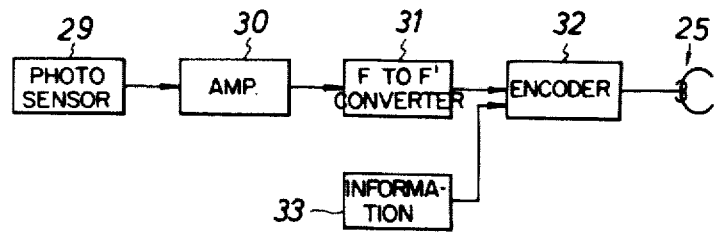
FIG. 7 is a schematic diagram illustrating method and apparatus for magnetic head-to-magnetic stripe writing for cards of FIG. 1.
Figure 8:
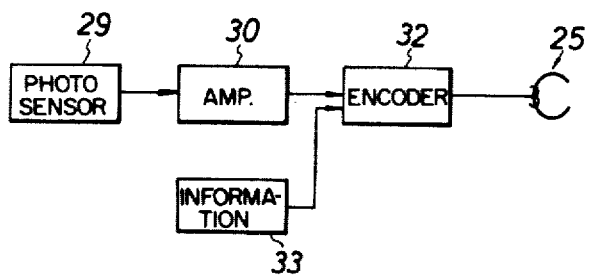
FIG. 8 is a schematic diagram illustrating modified writing method and apparatus similar to FIG. 7.
Figure 9:
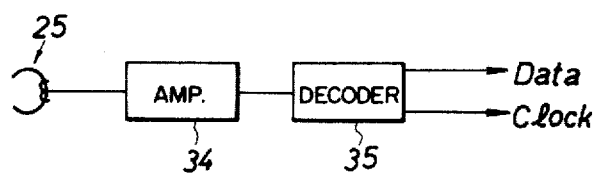
FIG. 9 is a schematic diagram illustrating frequency-to-frequency conversion used in the reading circuit.

The actions for reading and writing are described referring to the schematic diagrams. In FIGS. 7 and 8, illustrating writing, photo-sensor 29 feeds signals to amplifier 30 and frequency-to-frequency (F-F') conversion circuit 31. Encoder 32 encodes information to be written, and magnetic head 25 writes the information. In FIG. 7, F-F' conversion circuit 31 is included, but in FIG. 8 there is no F-F' conversion circuit. In FIG. 9 magnetic head 25 reads information and amplifier 34 sends the signals to decoder 35, which produces data and clock signals.

Figure 10:
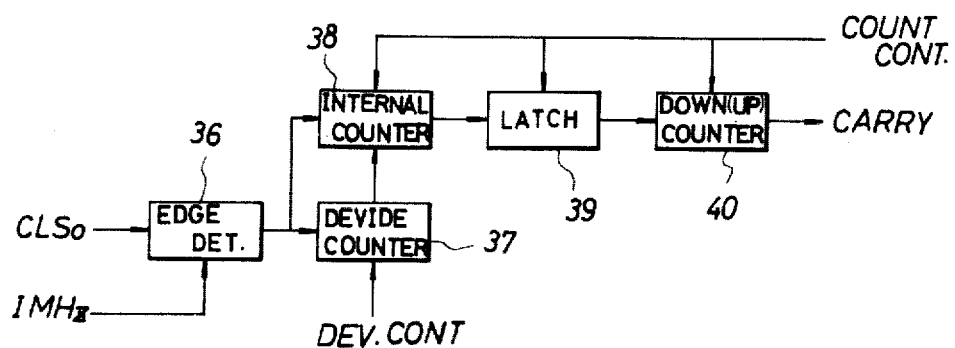
FIG. 10 is a schematic diagram illustrating edge detecting and counting circuits.

F-F' conversion is used because magnetic recording on magnetic stripe 21 of magnetic recording medium 20 has to be done with high density, but the gaps on the timing track 22 cannot be made so close for reasons both of printing the track and of detecting the gaps by the photo-sensor. Thus, the output frequency F' is made higher than the input frequency F to attain the above purpose. In FIG. 10 edge detector 36 is connected to dividing counter 37 and internal counter 38. A continuous count is provided to internal counter 38, latch 39 and down-up counter 40. CLSo is a clock signal; and 1MHz is an example of reference frequency entered on the magnetic stripe 21.

One feature of the present invention is that the length of gap bottom 24a from the gap 25a of magnetic head 25 to the end of the card guide slot is set equal to $L_1$, the length of a magnetic card 20. Thus, magnetic card 20 can be reliably moved leftward along base 24a and information recorded on magnetic stripe 21 can be read reliably by magnetic head 25. It is obvious that lengths of bottom 24a greater than $L_1$ suffice. Moreover, if the length of the inserted portion of the magnetic card 20 is equal to $L_1$ or $L_2$, reliable reading and writing of information will be assured.

Figure 3:
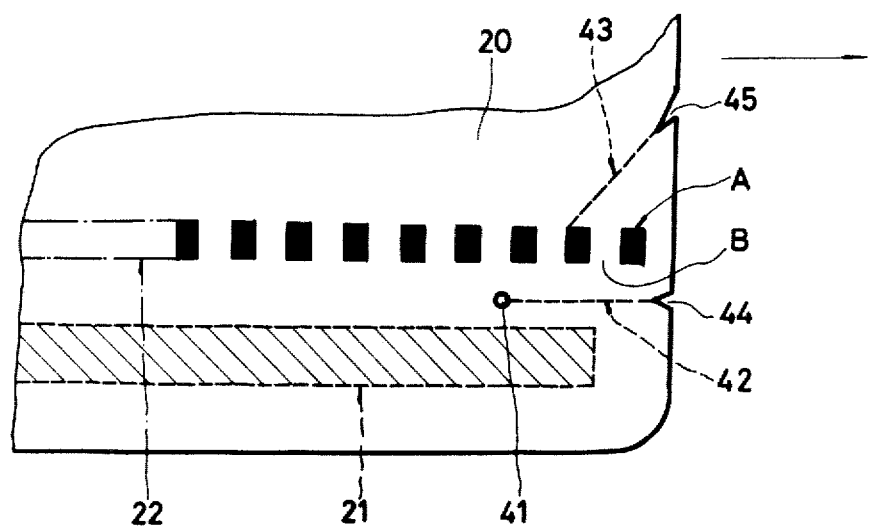
FIG. 3 is a partial detail view of the end of a magnetic card, illustrating a clippable portion of the timing track.

As indicated in FIG. 3, orifice 41 is formed on the magnetic card 20 at a specific distance from the card edge along timing track 22. Clipping lines 42 and 43 run from orifice 41 to the card edge. At the intersection of card edge and clipping lines 42 and 43. V-notches 44 and 45 are formed to specify clipping directions and at the same time to serve as the scissors-engaging guides. No clipping line should be drawn through timing track 22 between clipping line 43 and hole 41, because such a line likely would be detected by the light-emitting and receiving elements, thereby causing error.

Figure 11:
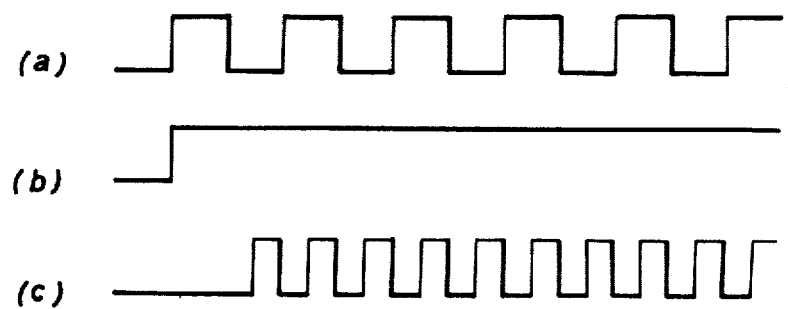
FIG. 11 illustrates pulse forms when using a magnetic card of FIG. 1 with no portion of the timing track clipped off: (a) the timing track signal, (b) the card loading signal and (c) the magnetic record playback signal.

FIG. 11 shows the timing track signal (a), the card loading signal (b) and the magnetic record playback signal (c) for a magnetic card with a full, unclipped timing track. The card loading signal (b) means that the state has changed upon the timing track signal (a) and the changed state is being maintained. As evident from this figure, in the case of a magnetic card with an end of timing track 22 not clipped off, the timing track signal (a) is issued earlier than the magnetic record playback signal (c).

Figure 12:
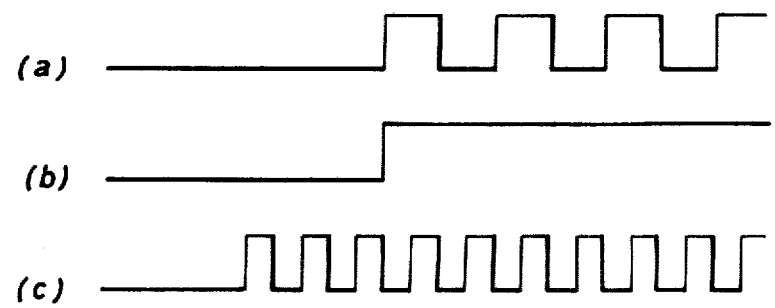
FIG. 12 illustrates pulse forms when using a magnetic card with a corner of the timing track clipped off as suggested in FIG. 3: (a) the timing track signal, (b) the card loading signal and (c) the magnetic record playback signal.

FIG. 12 shows the timing track signal (a), the card loading signal (b) and the magnetic record playback signal (c) for a magnetic card with an end of timing track 22 clipped off along lines 42, 43 are shown. In this case as evident from the figure, the timing track signal (a) is issued later than the magnetic record playback signal (c).

The magnetic recorder is arranged such that when the signals shown in FIG. 12 are issued, the only reading can take place regardless of the mode in which the recorder has been set, mistaken erasures reliably are averted by merely clipping the timing track from the magnetic card. When a magnetic card with a clipped timing track is inserted into the recorder which has been set in the writing mode, an alarm sounds or a lamp goes on; and the motor is stopped in a motor-driven recorder.

Instead of clipping the timing track, the object of the present invention can be attained by masking the clippable portion of the timing track with a tape or scraping off the timing track itself or canceling the timing track by any other means.

Figure 13:
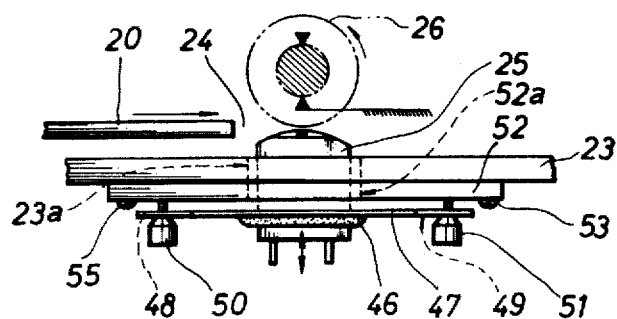
FIG. 13 is a front elevation of a magnetic head-holding mechanism used in the apparatus of FIG. 4 for reading the card of FIG. 4.
Figure 14:
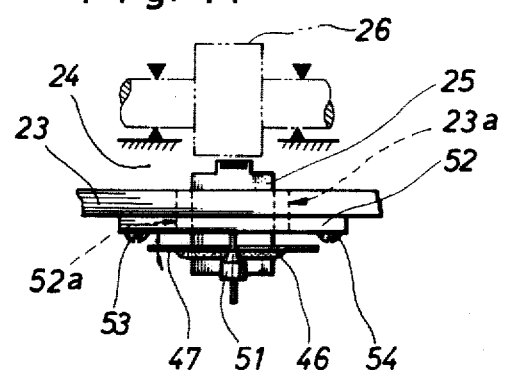
FIG. 14 is a right side elevation corresponding to FIG. 13.
Figure 15:
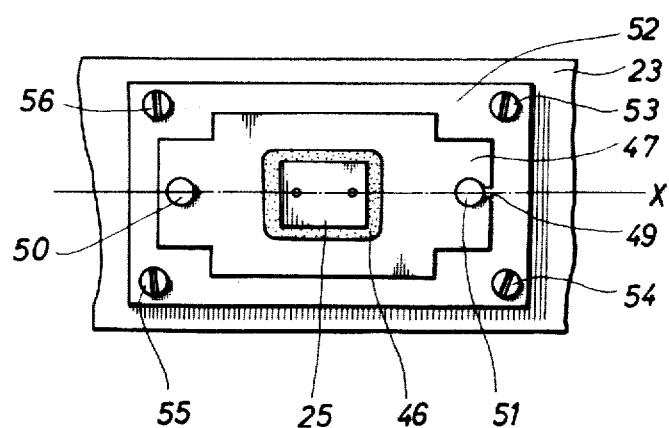
FIG. 15 is a bottom view corresponding to FIG. 13.

In FIGS. 13-15, a magnetic head-holding mechanism has magnetic head 25 fixed with resin 46 to leaf spring 47. One the leaf spring 47 are formed an orifice 48 and a long notch 49 along the central axis X (FIG. 15) of magnetic head 25. Orifice 48 may be a long notch; and both openings 48 and 49 may be slits. It is most desirable for prevention of fine vibration of the magnetic head 25 in contact with the card that the opening closer to the inserting direction of card 20 be an orifice 48 and the other opening be a long notch 49 or a slit. Pins 50 and 51 run through orifice 48 and notch 49 on leaf spring 47, and these pins are embedded in support 52. Junctions of pins 50 and 51 at leaf spring 47 are tapered so that leaf spring 47 can freely swing. Support 52 is fastened with screws 53, 54, 55 and 56 to magnetic card reader 23. Magnetic head 25 extends through opening 52a in support 52 and opening 23a in magnetic card reader 23. The tip of head 25 juts out into the card passage 24. Press roller 26 is rotatably held in opposition to magnetic head 25. There is no need to elastically support roller 26 in the direction of magnetic head 25. It suffices to simply rotatably hold roller 26. Under this arrangement leaf spring 47 vertically displaces itself, following bends in the magnetic card 20. Being supported at the tapered portions of the pins 49 and 50, the leaf spring is free to swing.

As described above, the magnetic card-holding mechanism permits the magnetic head to freely displace itself following bends in the card, not only in the longitudinal direction, but also in the transverse direction, thereby contributing vastly to reliable reading and writing of information. Meanwhile, use of the leaf spring simplifies the composition and reduces manufacturing cost, by obviating the necessity of elastically holding the press roller.

While the invention has been described with reference to particular embodiments it will be obvious to those skilled in the art that modifications and variations may be constructed and used without departing from the invention. The scope of the invention is described in the following claims.

We claim:

1. Magnetic card information transferring apparatus comprising data transferring means further comprising a magnetic head mounted on a leaf spring adjacent the magnetic card track and wherein the leaf spring is mounted to the apparatus at opposite ends of the leaf spring wherein one end is slotted and the leaf spring engages the magnetic head at two points on a central axis of the magnetic head.

2. The magnetic card information transferring apparatus of claim 1 wherein the leaf spring has a hole near one end and a slot near the other end, and wherein pins are mounted through the hole and through the slot for attaching the leaf spring to a frame of the apparatus.

3. The magnetic information transferring apparatus of claim 2 wherein the pins are radially extended uniformly outwardly, thereby forming conical portions adjacent the inner section of the pins and leaf spring whereby the leaf spring is held on conical portions of the leaf pins.

4. The magnetic card information transferring apparatus of claim 3 further comprising a roller rigidly mounted on the frame for rotation opposite the magnetic head.

5. The apparatus of claim 1 wherein the apparatus is longitudinally extended and wherein the apparatus further defines a slot extending downward into the apparatus and opening at opposite longitudinal ends of the apparatus and a base plate mounted on the apparatus at the bottom of the slot for receiving a bottom edge of the card.

6. The apparatus of claim 5 further comprising a magnetic card inserted in the slot, the magnetic card having a magnetic stripe and a parallel timing track positioned within the slot and wherein the detecting means is mounted on the apparatus opposite the timing track and wherein the transferring means is mounted on the apparatus opposite the magnetic stripe when the card is resting on the base plate.

7. A magnetic head mounting apparatus comprising an elongated leaf spring, resin means on a center of the spring for mounting a magnetic head, first and second openings at opposite ends of the spring for receiving anchored pins, and wherein at least one of the openings is an elongated slot.

8. The apparatus of claim 7 wherein a first opening is a circular aperture and wherein the second opening is an elongated slot.

9. The apparatus of claim 7 further comprising pins mounted in the openings, the pins having a relatively narrow shank portion with a distal end thereof connected to an anchor means, and the pins having a conical portion extending outward from the relatively narrow shank portion, and wherein the openings engage the pins on the conical portions.

10. The method of transferring information between a magnetic card and a transferring apparatus comprising inserting a card into an upward opening open-ended slot in a transferring apparatus with a top of the card exposed, moving a magnetic card through the slot along a base relative to the transferring apparatus, transferring magnetic information between the card and the apparatus, detecting relative movement and speed by detecting changes in a timing track adjacent a magnetic stripe on the card and controlling transferring of magnetic information in accordance with the detected speed of the card.

11. A magnetic head-holding mechanism comprising an elongated leaf spring means centrally on which a magnetic head is mounted, first and second openings formed at opposite ends of the spring means for receiving anchored pins to hold the spring means swayingly and movably in upper and lower directions.

12. The mechanism of claim 11 wherein at least one of the openings is an elongated slot.

13. The mechanism of claim 11 wherein the magnetic head and the spring means are fixed to one another with resin in the center of the elongated spring.

14. The mechanism of claim 11 further comprising pins mounted in the openings, the pins having a relatively narrow shank portion with a distal end thereof connected to an anchor means, and the pins having a conical portion extending outward from the relatively narrow shank portion, and wherein the openings engage the pins on the conical portions.

* * * * *